United States Patent
Avinash et al.

(10) Patent No.: US 7,248,749 B2
(45) Date of Patent: Jul. 24, 2007

(54) METHOD AND APPARATUS FOR SIGNAL-TO-NOISE RATIO DEPENDENT IMAGE PROCESSING

(75) Inventors: Gopal B. Avinash, New Berlin, WI (US); Robert Michael Vavrek, Waukesha, WI (US); Rakesh Mohan Lal, Waukesha, WI (US); Imran A. Bajwa, Milwaukee, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 790 days.

(21) Appl. No.: 10/629,155

(22) Filed: Jul. 29, 2003

(65) Prior Publication Data

US 2005/0025377 A1 Feb. 3, 2005

(51) Int. Cl.
*G06K 9/40* (2006.01)

(52) U.S. Cl. ............................. 382/260; 382/275

(58) Field of Classification Search ........ 382/130–132, 382/173, 190, 195, 206, 260–264, 266, 275; 708/322; 358/463; 356/300; 600/437, 443
See application file for complete search history.

(56) References Cited

U.S. PATENT DOCUMENTS

| | | | | |
|---|---|---|---|---|
| 4,573,070 A | * | 2/1986 | Cooper | 348/617 |
| 5,442,462 A | * | 8/1995 | Guissin | 358/463 |
| 5,653,234 A | * | 8/1997 | Kim et al. | 600/437 |
| 5,909,384 A | * | 6/1999 | Tal et al. | 708/322 |
| 6,122,405 A | * | 9/2000 | Khani | 382/261 |
| 6,173,083 B1 | | 1/2001 | Avinash | 382/260 |
| 6,341,180 B1 | * | 1/2002 | Pettersson et al. | 382/255 |
| 6,423,003 B1 | * | 7/2002 | Ustuner et al. | 600/443 |
| 6,579,238 B1 | * | 6/2003 | Simopoulos et al. | 600/443 |
| 6,643,011 B2 | * | 11/2003 | Kojima | 356/300 |
| 6,907,144 B1 | * | 6/2005 | Gindele | 382/275 |

* cited by examiner

*Primary Examiner*—Kanjibhai Patel
(74) *Attorney, Agent, or Firm*—McAndrews, Held & Malloy, Ltd.; Peter J. Vogel; Michael A. Dellapenna

(57) ABSTRACT

Certain embodiments of the present invention relate to a signal-to-noise ratio dependent image processing system. The method includes computing at least one SNR for at least one region of an image, determining a filter parameter for at least one region based on the at least one SNR, and processing at least one region of the image based on the filter parameter. In addition to SNR, a filter parameter may be determined using user preferences. The system includes a signal-to-noise ratio processor for determining a signal-to-noise ratio for an image. The system also includes a parameter selection unit for selecting at least one filter parameter based on the signal-to-noise ratio. The system further includes an image filter for filtering the image based on the filter parameter(s). In an embodiment, the SNR processor determines signal-to-noise ratio(s) for region(s) in the image.

24 Claims, 9 Drawing Sheets

METHOD AND APPARATUS FOR SIGNAL-TO-NOISE RATIO DEPENDENT IMAGE PROCESSING

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to image processing. In particular, the present invention relates to signal-to-noise ratio dependent image processing.

Medical diagnostic imaging systems encompass a variety of imaging modalities, such as x-ray systems, computerized tomography (CT) systems, ultrasound systems, electron beam tomography (EBT) systems, magnetic resonance (MR) systems, and the like. Medical diagnostic imaging systems generate images of an object, such as a patient, for example, through exposure to an energy source, such as x-rays passing through a patient, for example. The generated images may be used for many purposes. For instance, internal defects in an object may be detected. Additionally, changes in internal structure or alignment may be determined. Fluid flow within an object may also be represented. Furthermore, the image may show the presence or absence of objects in an object. The information gained from medical diagnostic imaging has applications in many fields, including medicine, manufacturing, and security.

Images are typically formed from pixel (picture element) image data acquired from an imaging system. Acquisition of image data defining each pixel varies depending on the imaging modality used to obtain the data. Discrete pixel images included in an array or matrix of pixels having varying properties, such as intensity and color. Generally, each pixel is represented by a signal. The signal is typically a digitized value representative of a detected parameter, such as an excitation of material in each pixel region producing radiation, for example. To facilitate interpretation of the image, the pixel values must be filtered and processed to enhance definition of features of interest to an observer.

Forming the best possible image at all times for different anatomies and patient types is important to diagnostic imaging systems. Poor image quality may prevent reliable analysis of the image. For example, a decrease in image contrast quality may yield an unreliable image that is not usable clinically. Noise may be introduced in image data due to defects, imperfections, and other interference in the imaging system or the object being imaged. Noise in an image may result in blurring, streaking, or introduction of ghost images or artifacts in a resulting image.

Anatomical details become more obscure with greater noise relative to the data signal. Therefore, a low signal-to-noise ratio (SNR) is undesirable. However, a low SNR often occurs, such as when a short scan duration or lower dose is important. Additionally, in some modalities, such as magnetic resonance imaging, a signal intensity of different tissue types may be suppressed to varying degrees.

In order to address a low SNR in images, an SNR and/or a contrast-to-noise ratio (CNR) is first measured. Various methods are available to measure SNR and/or CNR by attempting to quantify an amount of signal intensity variation or noise that is unrelated to an anatomy being imaged. In one method, for example, two sequential images may be selected to measure SNR. The image data of image one is analyzed to determine the center of the image for positioning a region of interest (ROI). A signal value (S) is computed as a mean pixel value in a ROI covering 80% of a phantom in the first image. Subtracting the second image from the first image creates a difference image. The same ROI is used to calculate a standard deviation (SD) of the subtracted image. Noise (N) is calculated as (SD)/sqrt (2). In another method, where an imaged object does not fill the entire field of view, a signal may be measured in an air region surrounding the object to establish a noise level.

Various techniques have been employed to enhance discrete pixel images to facilitate interpretation of the images. Enhancement or image filtering techniques may employ identification of contrast regions, edges, and other image components, for example. Image components are defined by a series of pixels or groups of pixels within an image matrix. Smoothing and sharpening steps may be employed to enhance certain edges or contrast regions or to de-emphasize specific areas not considered regions of interest. Current techniques, however, may not provide a desired image quality and image filter performance.

Interpolation of image data may produce or change image noise characteristics in an image. Image filters that do not consider variability in interpolation may produce sub-optimal images. Additionally, image filter frameworks that do not consider interpolation variances may require more time and be less efficient in image processing. Inefficiency and delay may impact customers seeking to use the images. Inefficiencies in the image filter framework may also involve more data sets to facilitate image tuning.

Image filtering is generally also applied to computationally improve SNR. However, current image filtering methods do not adequately compute noise in individual images. Therefore, current methods use multiple sets of global parameters to address various levels of noise. Even if a uniform noise level is assumed throughout a given image, the SNR among different regions (corresponding to different tissue types) will vary. Consequently, no single imaging filter with a fixed parameter set when applied to an image may be optimal for all regions within the image. Furthermore, there are no known methods to perform signal dependent noise mitigation and enhancement at every pixel throughout an image.

Therefore, a need exists for an improved image filtering system and method. A system and method that processes an image using signal dependent filtering would be highly desirable.

BRIEF SUMMARY OF THE INVENTION

Certain embodiments of the present invention provide a method and system for signal-to-noise ratio (SNR) dependent image processing. In a certain embodiment, the method includes measuring noise in an image and computing a signal-to-noise ratio for the image. Then, the method includes selecting parameters for an image filter framework based on the signal-to-noise ratio and processing the image in the filter framework using the parameters. The parameters may also be selected based on user preference. The parameters selected may vary locally and/or globally.

In an embodiment, a signal-to-noise ratio may be computed for a region in the image. A plurality of SNRs for a plurality of regions in the image may be computed. Parameters may be selected for the image filter framework based on the plurality of SNRs.

In a certain embodiment, the method includes computing at least one SNR for at least one region of an image, determining a filter parameter for at least one region based on the at least one SNR, and processing at least one region of the image based on the filter parameter. In addition to SNR, a filter parameter may be determined using user preferences. Parameters selected may vary locally and/or globally. Noise in the image may be calculated, for example, based on a difference between the image and a smoothed version of the same image.

In a certain embodiment, the system includes a signal-to-noise ratio processor for determining a signal-to-noise ratio for an image. The system also includes a parameter selection unit for selecting at least one filter parameter based on the signal-to-noise ratio. The system further includes an image filter for filtering the image based on the filter parameter(s). In an embodiment, the SNR processor determines signal-to-noise ratio(s) for region(s) in the image.

In an embodiment, the parameter selection unit selects locally varying parameters and globally varying parameters. The locally varying parameters may include blend and edge-smooth parameters, for example. The globally varying parameters include a focus parameter, for example. In an embodiment, the locally varying parameters are determined based on a histogram of local SNRs. In an embodiment, the globally varying parameters are determined based on a histogram of SNRs for a plurality of images.

The parameter selection unit may include a lookup table relating SNR and filter parameters. The lookup table may relate SNRs to filter parameters based on user preferences. The parameter selection unit may also select filter parameter(s) based on user preference.

Figure 1:
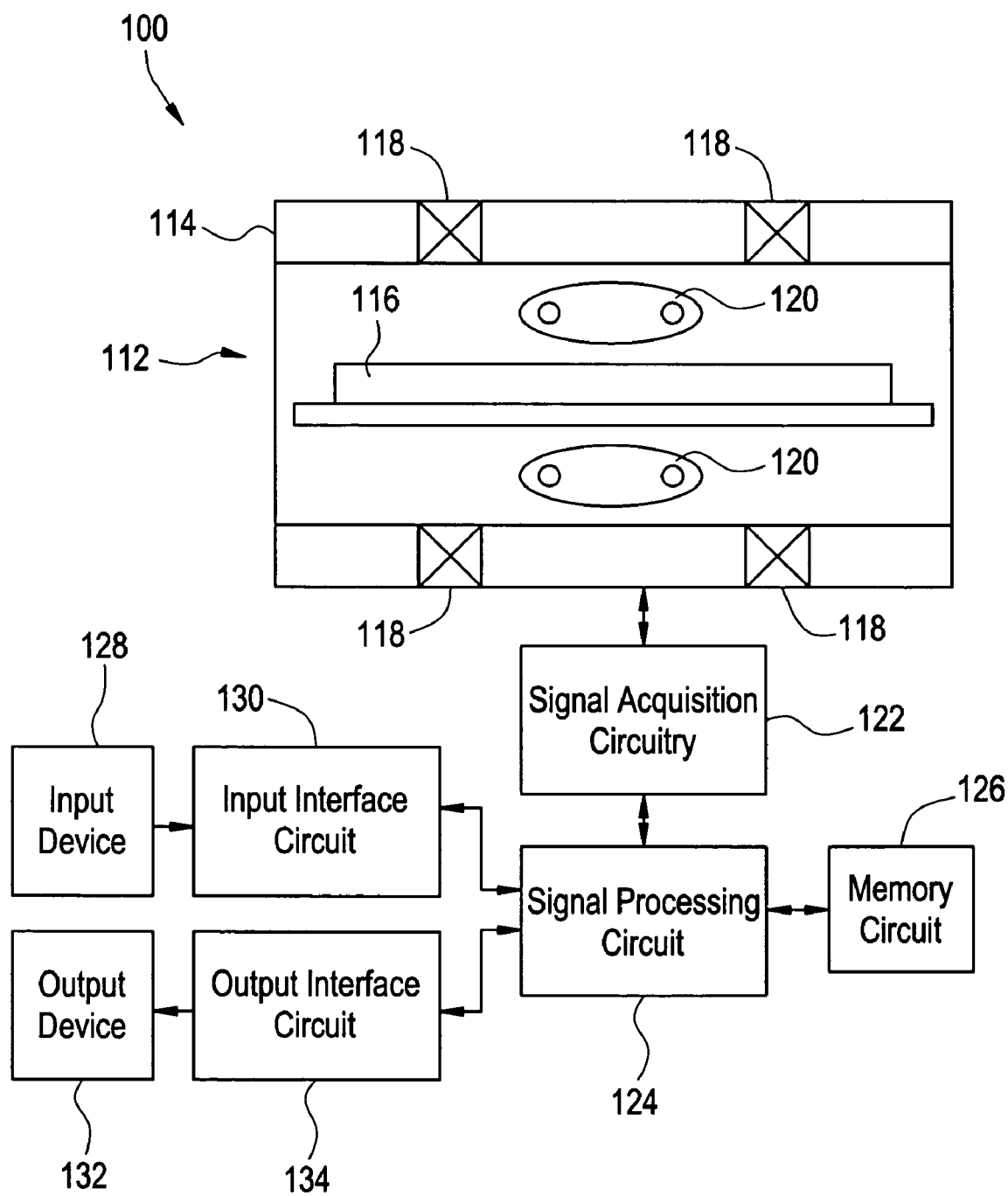
FIG. 1 illustrates a magnetic resonance imaging system used in accordance with an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentality shown in the attached drawings.

DETAILED DESCRIPTION OF THE INVENTION

For illustration purposes only, certain embodiments of the present invention are described in relation to a magnetic resonance imaging system. Embodiments of the present invention may apply to a plurality of modalities, such as magnetic resonance imaging, x-ray imaging, computed tomographic imaging, electron beam tomographic imaging, PET imaging, SPECT imaging, and ultrasound imaging.

A method and apparatus for analyzing image structures and enhancing an image for display is described in U.S. Pat. No. 6,173,083, to Gopal B. Avinash, filed on Apr. 14, 1998. The patent is hereby incorporated by reference in its entirety.

FIG. 1 illustrates a magnetic resonance imaging system 100 used in accordance with an embodiment of the present invention. The system 100 includes a scanner 112 coupled to circuitry for acquiring and processing discrete pixel data. The scanner 112 includes a support structure 114 in which a subject 116, such as a human, may be placed for acquiring images representative of internal features, such as tissues, fluids, and other bodily components. The scanner 112 includes an electromagnet arrangement 118 for producing an electromagnetic field. Excitation and sensing coils 120 are provided within the scanner 112 for exciting gyromagnetic materials within the subject 116 and for sensing emissions from the materials. In an embodiment, the data processing components of the system 100 are included in a programmable digital computer or other general-purpose computing device. In another embodiment, processing circuitry is configured as appropriate coding in application-specific microprocessors, analog circuitry, or a combination of digital and analog circuitry, for example.

Signals sensed by the coils 120 are encoded to provide digital values representative of the excitation signals emitted at locations within the subject 116 and are transmitted to a signal acquisition circuitry 122. The signal acquisition circuitry 122 also provides control signals for configuration and coordination of fields emitted by the coils 120 during image acquisition sequences. The signal acquisition circuitry 122 transmits encoded image signals to a signal processing circuit 124. The signal processing circuit 124 executes pre-established control logic routines stored within a memory circuit 126 to filter and condition the signals received from the signal acquisition circuitry 122 to provide digital values representative of each pixel in an acquired image. The digital values are then stored in the memory circuitry 126 for subsequent processing and display.

The signal processing circuit 124 receives configuration and control commands from an input device 128 via an input interface circuit 130. The input device 128 may include an operator's station and keyboard, for example, for selectively inputting configuration parameters and for commanding image acquisition sequences. The signal processing circuit 124 is also coupled to an output device 132 via an output interface circuit 134. The output device 132 may include a monitor or printer, for example, for generating reconstituted images based on image enhancement processing carried out by the circuit 124.

Figure 2:
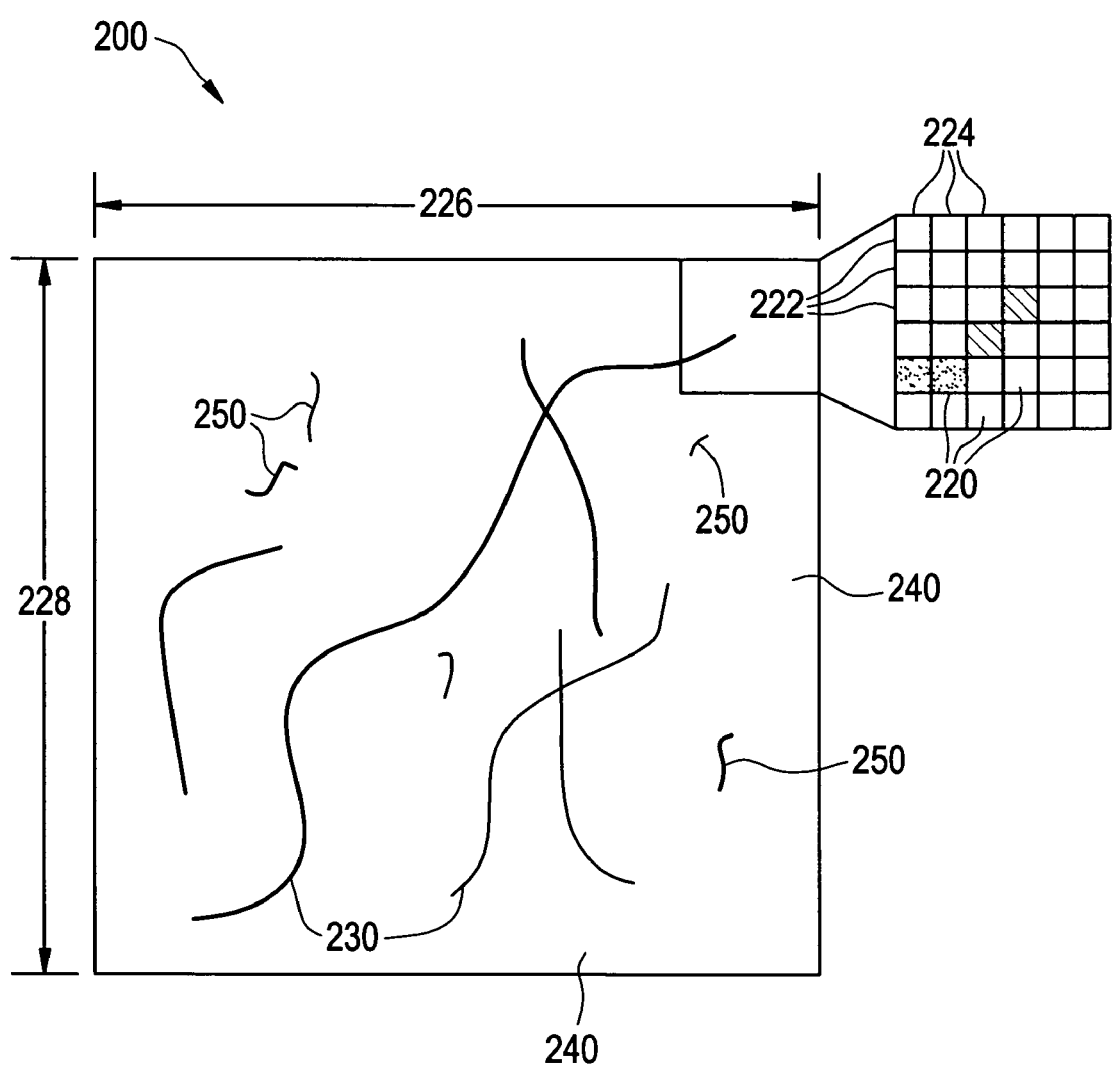
FIG. 2 illustrates an example of a discrete pixel image produced in the system in accordance with an embodiment of the present invention.

FIG. 2 illustrates an example of a discrete pixel image 200 produced in the system 100 in accordance with an embodiment of the present invention. The image 200 includes a matrix of discrete pixels 220 disposed adjacent to one another in a series of rows 222 and columns 224. The rows 222 and columns 224 of pixels provide a matrix width 226 and height 228. Matrix dimensions may include 256×256 pixels, 512×512 pixels, and 1024×1024 pixels, for example. A particular image matrix size may be selected via the input device 128. Image matrix size may vary depending upon factors such as the subject 116 to be imaged and a resolution desired in the image.

The image 200 includes structural regions 230. The structural regions 230 are illustrated as long, contiguous lines defined by adjacent pixels, for example. The image 200 also includes non-structural regions 240 that lie outside of structural regions 230. The image 200 may also include isolated artifacts 250. The artifacts 250 may be of various sizes (i.e., number of adjacent pixels). The artifacts 250 may be defined as structural regions 230 or may be eliminated from a definition of structure, for example. Structural regions 230 and non-structural regions 240 are identified and enhanced in the image 200 in accordance with control logic. The control logic is preferably implemented by the signal processing circuit 124 based upon appropriate programming code stored within the memory circuit 126.

SNR-dependent filtering may be useful in mitigating noise and enhancing useful features. Certain embodiments of the present invention provide automatic SNR-dependent image filtering using image data. Using an estimate of noise in an image, a regional SNR map is computing for the entire image. Using the SNR map and logic for locally-varying blending functions and globally-varying parameter sets, automated SNR-dependent filtering may be obtained.

Figure 3:
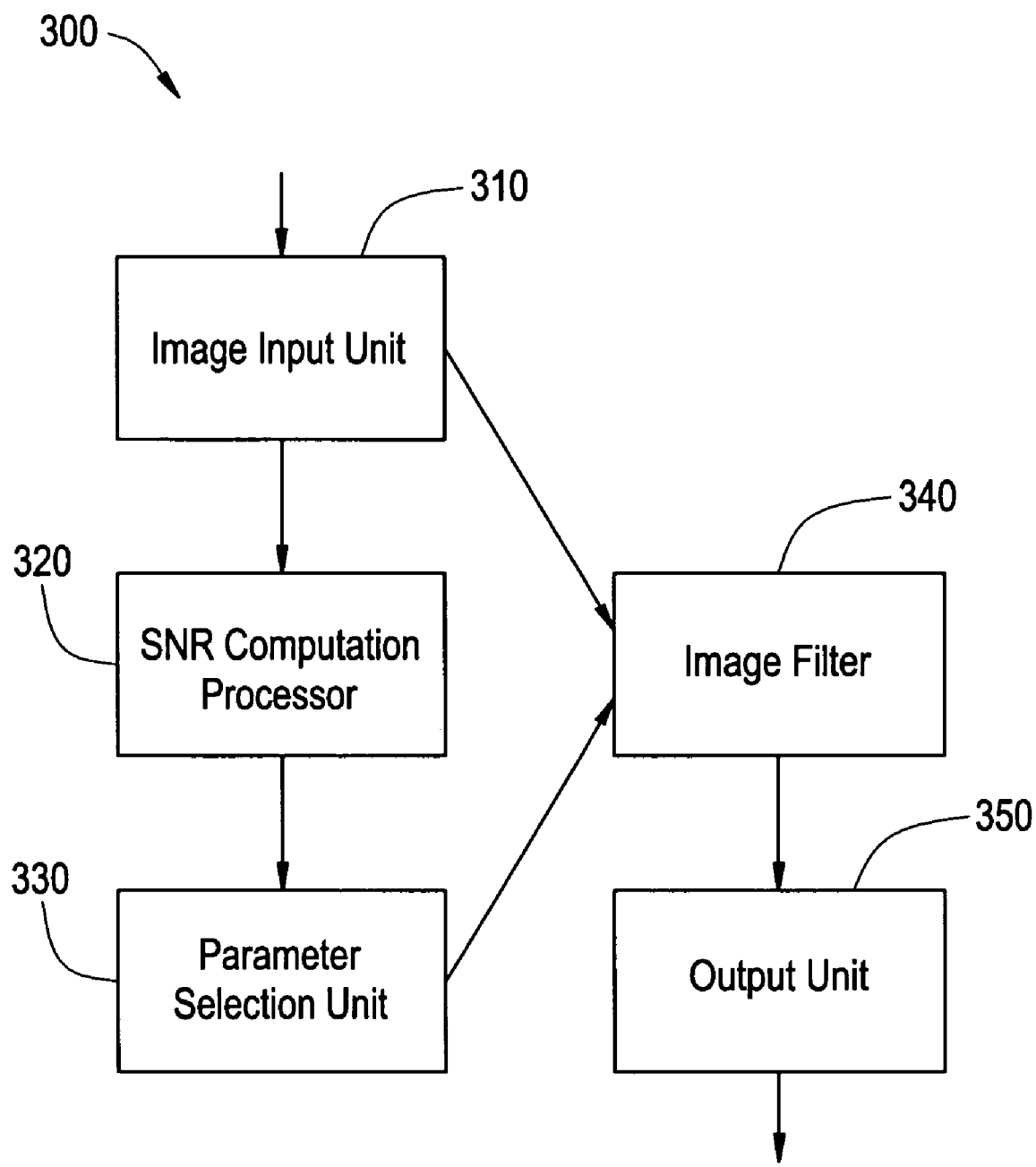
FIG. 3 illustrates an image processing system used in accordance with an embodiment of the present invention.

FIG. 3 illustrates an image processing system 300 used in accordance with an embodiment of the present invention. The image processing system 300 includes an image input unit 310, a SNR processor 320, a parameter selection unit 330, an image filter 340, and an image output unit 350. The components of the image processing system 300 may be implemented in hardware and/or in software. The components of the image processing system 300 may be implemented in separate units and/or in combination.

The image input unit 310 provides image data to the SNR processor 320, and the image filter 340. The SNR processor 320 provides signal-to-noise ratio data to the parameter selection unit 330. The parameter selection unit 330 provides parameters to the image filter 340. The image filter 340 filters input image data to produce an output image for storage and/or display. The output image is stored and/or displayed by the image output unit 350. The components of the image processing system 300 may be integrated into a single unit, such as a computer, or may be distributed among multiple processing units, for example. The components of the image processing system 300 may be connected using wired connections, wireless connections, infrared connections, or other data connections, for example.

The image input unit 310 provides image data obtained from an imaging system. The image data represents pixels in an image. The image input unit 310 routes image data from an imaging system to the image processing system 300 for image processing and filtering to enhance a resulting image.

The SNR processor 320 determines noise in an image and calculates a ratio between the image data signal and the noise (the SNR). Several methods may be used to determine the SNR for an image and for regions of an image. In one embodiment, selective filtering of image regions is accomplished by homogenizing or smoothing regions within an image. A difference between the original region and the homogenized region may be considered noise. A ratio of an intensity of the homogenized region to the noise may be used to determine the SNR. A SNR may be computed from an acquired image or from a test image, for example.

Figure 4:
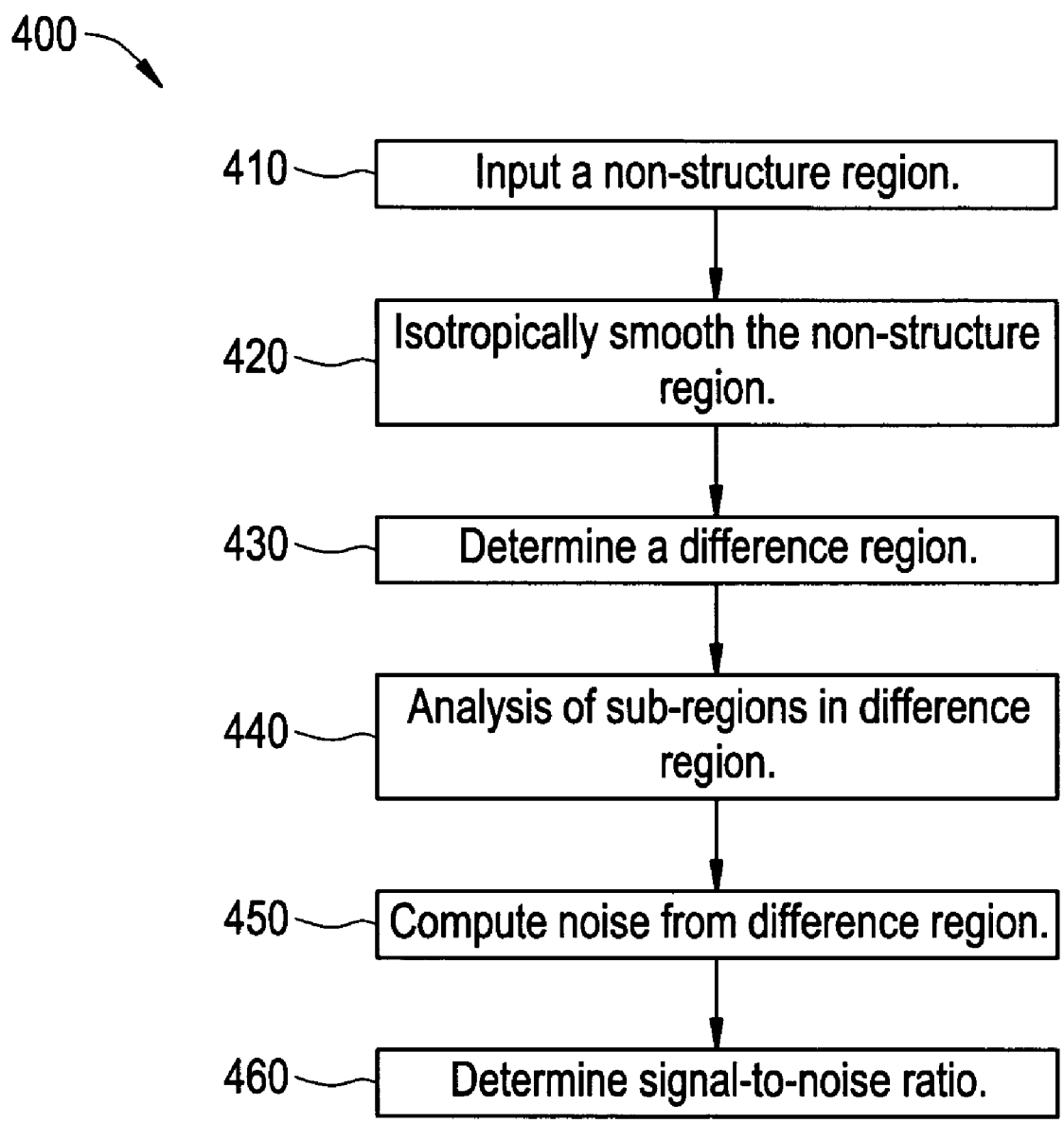
FIG. 4 illustrates a flow diagram for a method for SNR computation using smoothing of non-structure regions in accordance with an embodiment of the present invention.

FIG. 4 illustrates a flow diagram for a method 400 for SNR computation using smoothing of non-structure regions in accordance with an embodiment of the present invention. First, at step 410, image data from a non-structure region of an image is input to the SNR processor 320. Then, at step 420, the data of the non-structure region is isotropically (e.g., equally) smoothed. Next, at step 430, a difference region between the smoothed and original non-structure region data is determined. At step 440, an analysis of sub-regions within the difference region may also be performed. Then, at step 450, noise is computed from the difference region data. Finally, at step 460, a SNR for the region is determined from the noise and image signal data. The SNR data may be output to the parameter selection unit 330.

Figure 5:
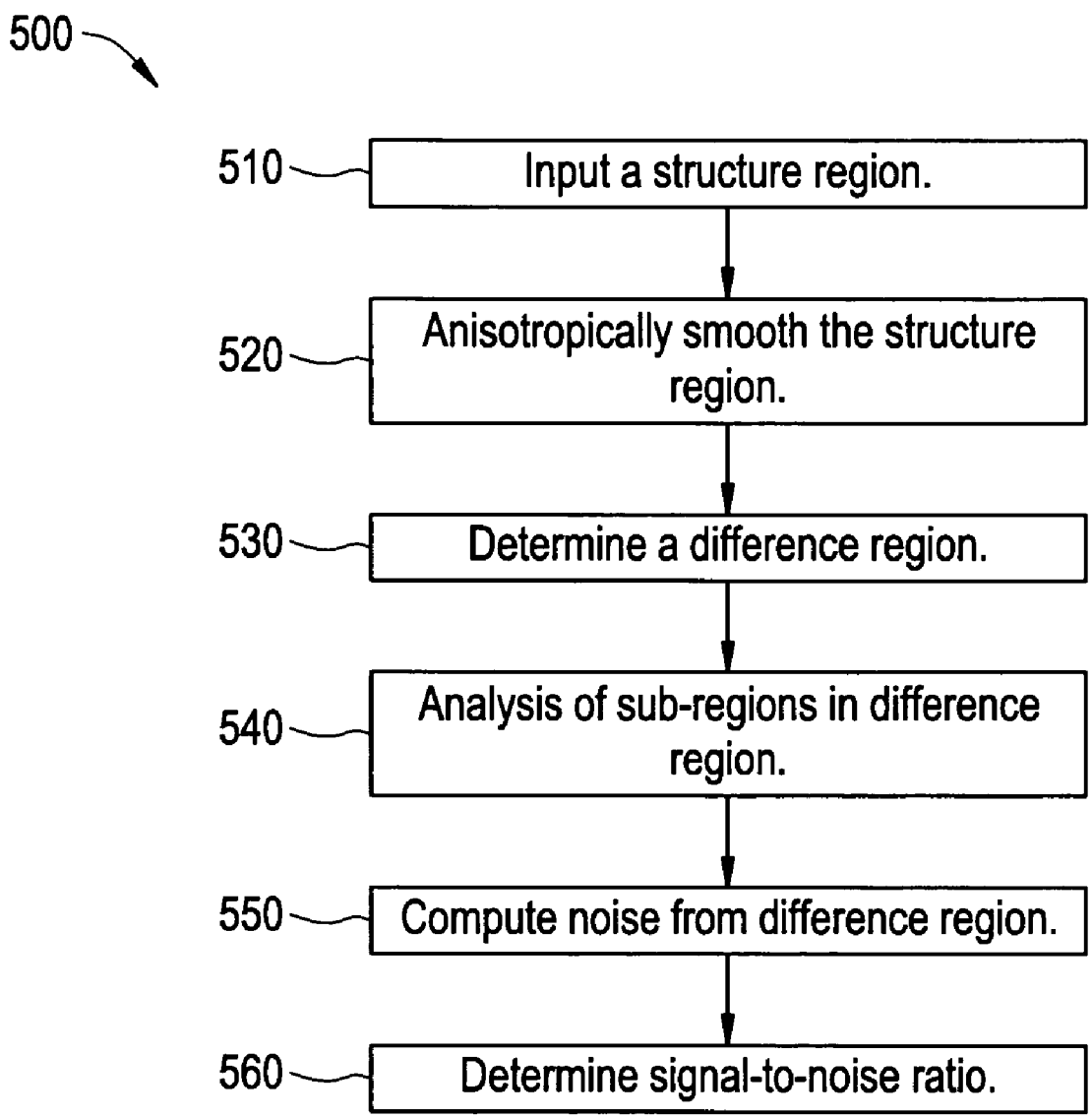
FIG. 5 shows a flow diagram for a method for SNR computation using smoothing of structure regions in accordance with an embodiment of the present invention.

A similar homogenization analysis may be performed on structure regions as well. FIG. 5 shows a flow diagram for a method 500 for SNR computation using smoothing of structure regions in accordance with an embodiment of the present invention. First, at step 510, image data from a structure region of an image is input. Then, at step 520, the data of the structure region is anisotropically (e.g., variantly) smoothed. Next, at step 530, a difference region between the smoothed and original structure region data is determined. At step 540, an analysis of sub-regions within the difference region may also be performed. Then, at step 550, noise is computed from the difference region data. Finally, at step 560, a SNR for the region is determined from the noise and image signal data. The SNR data may be output to the parameter selection unit 330.

The methods 300, 400 described above may be used to obtain noise and SNR values for each pixel in an image. Since segmentation of regions to be homogenized in the image relates to a specific parameter (focus, for example) of an image filtering algorithm, segmentation may be inaccurate due to variation in SNR. Thus, SNR may be computed based on one or more sub-regions of the segmented region to be homogenized, as in steps 440 and 540 shown in FIGS. 4 and 5, respectively. The sub-region may be determined through an analysis of a histogram including an edge strength of pixels in the region to be homogenized.

Figure 6:
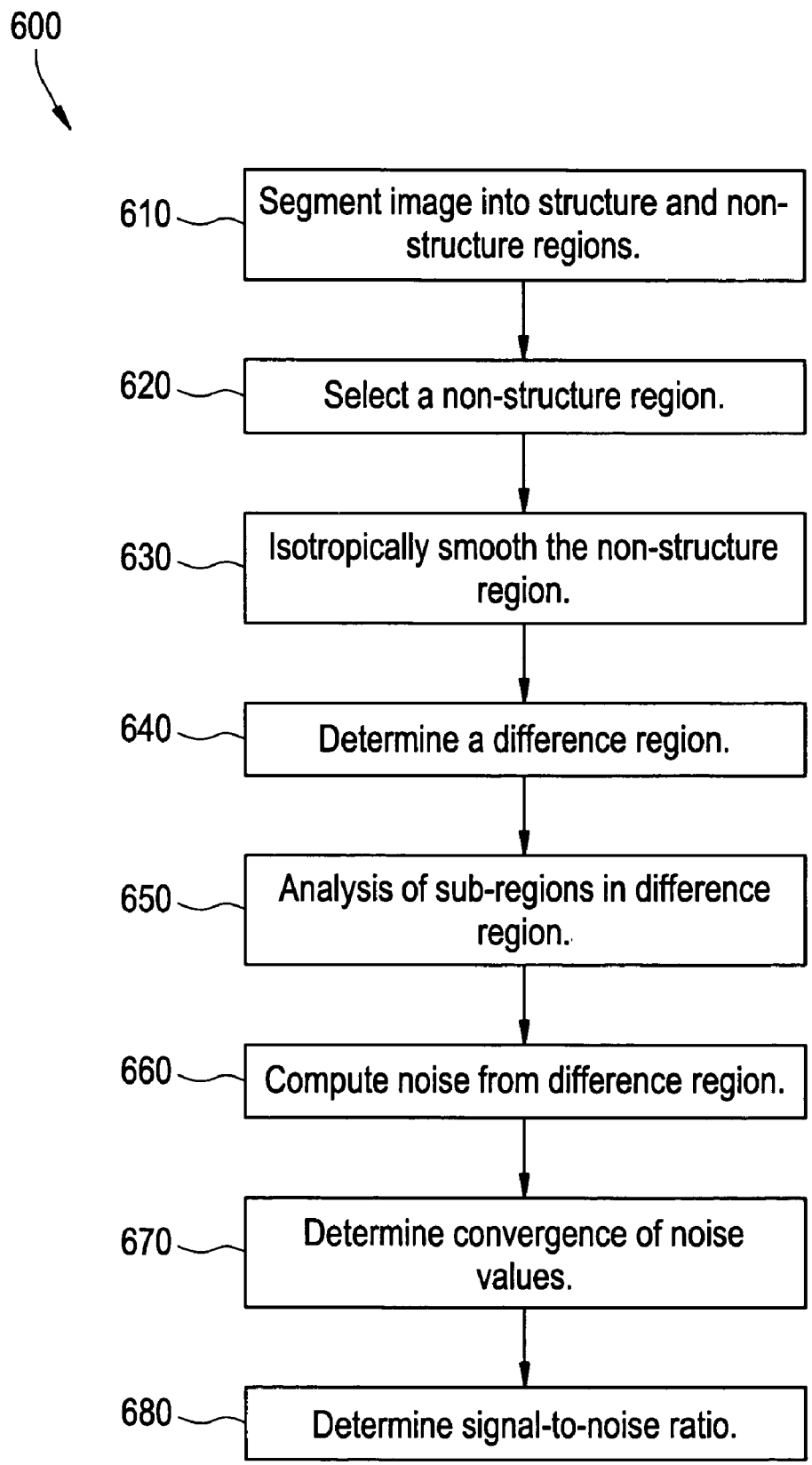
FIG. 6 illustrates a flow diagram for a method for iterative SNR computation in accordance with an embodiment of the present invention.

Alternatively, segmentation of regions and SNR computation for the region may be performed iteratively until the segmented region and SNR values converge to a final result. FIG. 6 illustrates a flow diagram for a method 600 for iterative SNR computation in accordance with an embodiment of the present invention. First, at step 610, an image is segmented in structure and non-structure regions. Then, at step 620, a non-structure region is selected. At step 630, the image data of the non-structure region may be isotropically smoothed. Then, at step 640, a difference region is determined from the smoothed and non-smoothed non-structure region data. Next, at step 650, an optional analysis of sub-regions in the difference region may be performed to help determine noise values. At step 660, noise is computed for the non-structure region based on the difference region data and optionally on the sub-region analysis. Then, at step 670, the method 600 is repeated until noise values converge to a focus value. For successive iterations, the focus value that determines segmentation of regions may be changed. If the noise values converge, then at step 680, an SNR is determined for the region.

Figure 7:
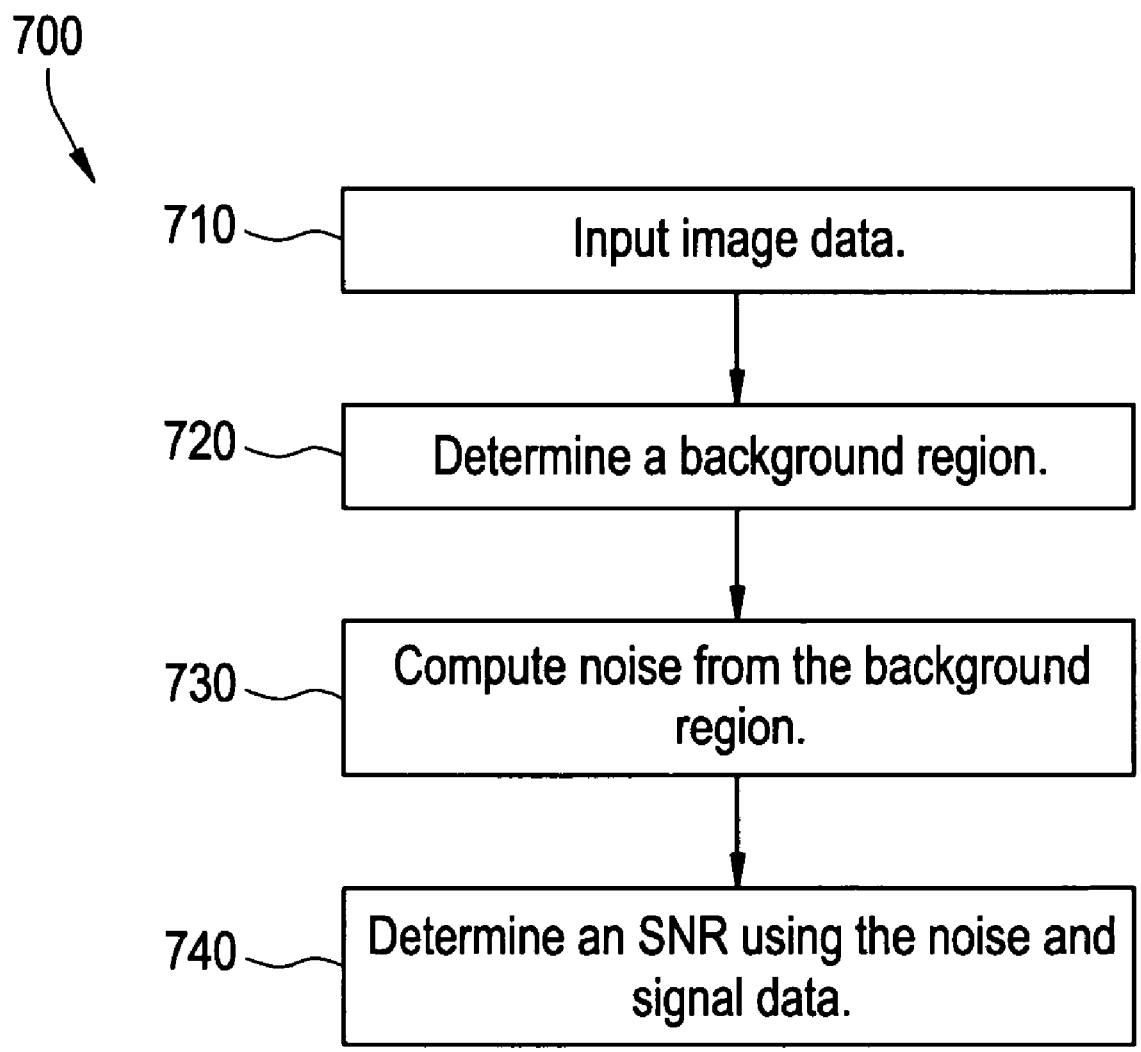
FIG. 7 depicts a flow diagram for a method for SNR computation using signal intensity in air in accordance with an embodiment of the present invention.

Another approach to determine an SNR for one or more regions in an image is to measure an image data signal intensity in air to determine noise levels. FIG. 7 depicts a flow diagram for a method 700 for SNR computation using signal intensity in air in accordance with an embodiment of the present invention. First, at step 710, image data is input to the SNR processor 320. In order to calculate an SNR, background or air regions in the image are determined. At step 720, a background region of the image is determined. Then, at step 730, noise is computed from the background region. At step 740, an SNR is determined using the noise and signal data. An image may be separated into structure and non-structure regions, for example. Local SNR is estimated at separate regions. The local SNR estimates may be used to control image filtering parameters.

In another embodiment, several modality specific transform domain techniques may be used to determine an SNR. For example, in magnetic resonance imaging, a raw data correlation method involving a center of K-space along with end rows of K-space may be used to measure SNR. Raw data may be used prior to image reconstruction. Appropriate regions may be selected from the image. Noise values may be computed from the raw image data for the selected regions. Then, SNR values may be determined from the noise and raw data.

After the SNR processor 320 has computed an SNR for a region or regions in the image, the SNR value(s) are transferred to the parameter selection unit 330. The parameter selection unit 330 uses the SNR to guide selection of parameters for an image filter framework. Image filtering parameters include shrink, interpolation, blend, edge smooth, sharpness, and focus, for example. Image filtering parameters may vary locally and/or globally. In an embodiment, the blend and edge smooth parameters vary locally, and the focus parameter varies globally. In an embodiment, the parameter selection unit includes a lookup table relating an SNR to filtering parameter(s). The lookup table may be generated based on user preferences or other criteria.

In an embodiment, the lookup table is generated empirically by a user trained in image interpretation. For a given SNR range, the user's preferences are recorded in the lookup table. A plurality of images of various body parts may be generated using different protocols to produce a variety of perceived SNR ranges. For the SNR ranges, filtering parameters are generated in the lookup table based on user image filter preferences. The lookup table may also be modified based on feedback from users and other medical practitioners. Alternatively, the lookup table of image filter parameters may be dynamically generated during imaging. The lookup table may be generated in software in the image processing system 100 or implemented in hardware or firmware, for example.

A global parameter uses a threshold to divide an image into structure and non-structure using visually relevant features and/or another criteria. Global parameters are used for an entire image. Local parameters vary depending on the SNR for a region. The SNR may change smoothly in some areas and not in others, for example. Locally-varying parameters, such as blending, may differ in structural and non-structural areas, for example. In an embodiment, global and local parameters are chosen from the lookup table based on computed SNR. Alternatively, the parameters may be dynamically generated, selected by a user, or retrieved from memory, for example.

In an embodiment, the blend and edge smooth parameters vary locally. The blend parameter indicates an amount blended in non-structure areas (e.g., non-structure blend). The edge smooth parameter indicates an amount blended in structure areas (e.g., structure blend). Blend and edge smooth parameters are developed based on filtering effects on a large number of images. For example, a SNR histogram may be obtained from a large number of images. A SNR histogram may also be obtained locally from region(s) in an image. The SNR histogram may then be converted into N bins (N=10, for example). Blending parameters may be varied dependent upon local SNR. For example, high SNR regions have lower filtered data compared to higher filtered data in low SNR regions. Global parameters, such as focus, are also based on filtering effects on a large number of images. For example, the focus parameter may have a higher value for low SNR images and a lower value for high SNR images.

Figure 8:
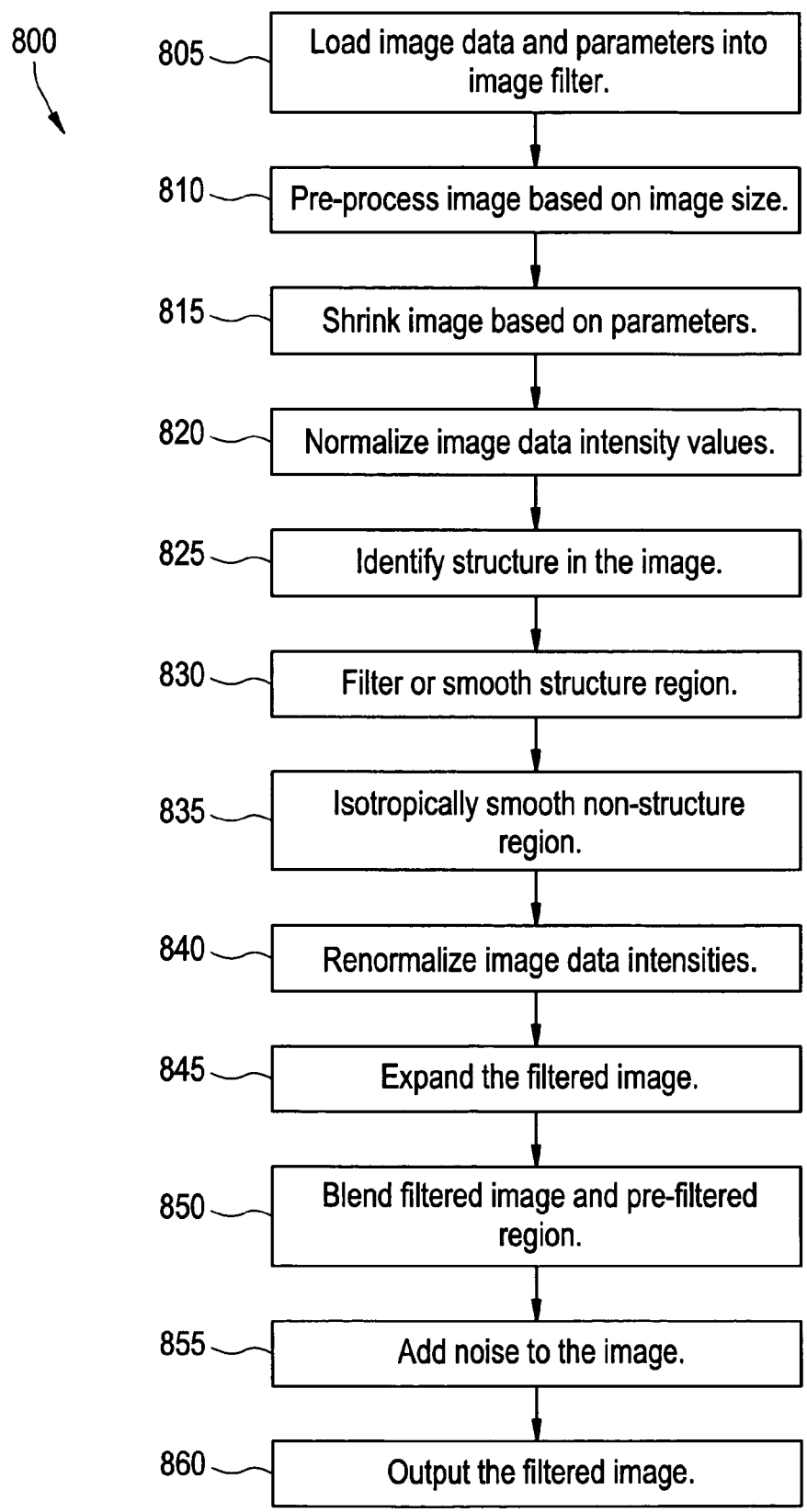
FIG. 8 illustrates a flow diagram for a method for image filtering used in accordance with an embodiment of the present invention.

After parameters for the image regions have been selected by the parameter selection unit 330, the parameters are transmitted to the image filter 340. The image filter 340 uses the selected parameters to filter and process the image data. Another embodiment of an image filter and filtering method are further described in U.S. patent application Ser. No. 10/193,564, filed on Jul. 11, 2002, with inventor Gopal Avinash. The application is hereby incorporated in its entirety. FIG. 8 illustrates a flow diagram for a method 800 for image filtering used in accordance with an embodiment of the present invention. First, at step 805, the image data and parameters are loaded into the image filter 340. Then, at step 810, the image is pre-processed based on the size of the image. Image data is mirrored to pad image boundaries in order to prevent data loss from shrinking the image. Next, at step 815, the image is shrunk based on the shrink and interpolation parameters.

Then, at step 820, image data intensity values are normalized. Image data values are scaled based on an average intensity value. Next, at step 825, structures are identified in the image. That is, structures and non-structures are extracted from the input image. The focus parameter, for example, is used to identify and extract the structures and non-structures. In an embodiment, gradient segments are identified using a connectivity analysis and scaled using the focus parameter. Structure and non-structure binary masks are created with pixels set to one if the image data satisfies a certain criteria. Otherwise, the pixels are set to zero. The masks describe the structure and non-structure of the image.

At step 830, a region with structures is filtered or smoothed. Additionally, an orientation map is generated from the smoothed data. A dominant orientation may be determined and iteratively used to smooth the image data. Orientation filtered structure pixels above a certain gradient value may also be edge sharpened using the sharpness parameter. Then, at step 835, a non-structure region is isotropically smoothed. The non-structure region undergoes homogenization smoothing through iterative low-pass filtering of the non-structure region data.

At step 840, image data intensities are renormalized. An average pixel intensity is computed in the filtered image. A normalization factor is generated and used to compute a normalized image. Next, at step 845, the filtered image is expanded. Interpolation expands the image to the original size of the image. Interpolation also expands the binary structure and non-structure masks. Then, at step 850, the interpolated, filtered image and the pre-filtration image are blended. Blend and edge smooth parameters are used to blend the filtered and unfiltered images. At step 855, noise is added to the image. For example, a small amount of intensity dependent, uniform noise is added to the interpolated image to visually enhance the image. The noise may be added to the image based on the structure and non-structure masks. Finally, at step 860, the filtered image data is output to the output unit 350 for display, storage, or other use.

After the image has been processed and filtered by the image filter 340, the filtered image data is transmitted to the image output unit 350. The image output unit 350 displays and/or stores the filtered image data. The filtered image data may also be transmitted via facsimile, via electronic mail, and/or electronically to an external computer or storage.

Thus, certain embodiments of the present invention facilitate improved filtering and processing of an image using parameters selected based on SNRs determined for the image and regions within the image. Noise may be measured in an image, as well as SNRs, and parameters are selected based on the SNRs. In certain embodiments, approximate SNR values may be used to determine image filtering parameters. In certain embodiments, parameters are selected based partially on computed SNR and partially on user preference. Parameters may be selected locally or regionally, rather than simply globally.

Certain embodiments provide SNR-dependent image filtering and domain-dependent image filtering. Image filtering is configured based on regional SNRs in an image. Image filtering may also be customized according to user and application, for example.

Figure 9:
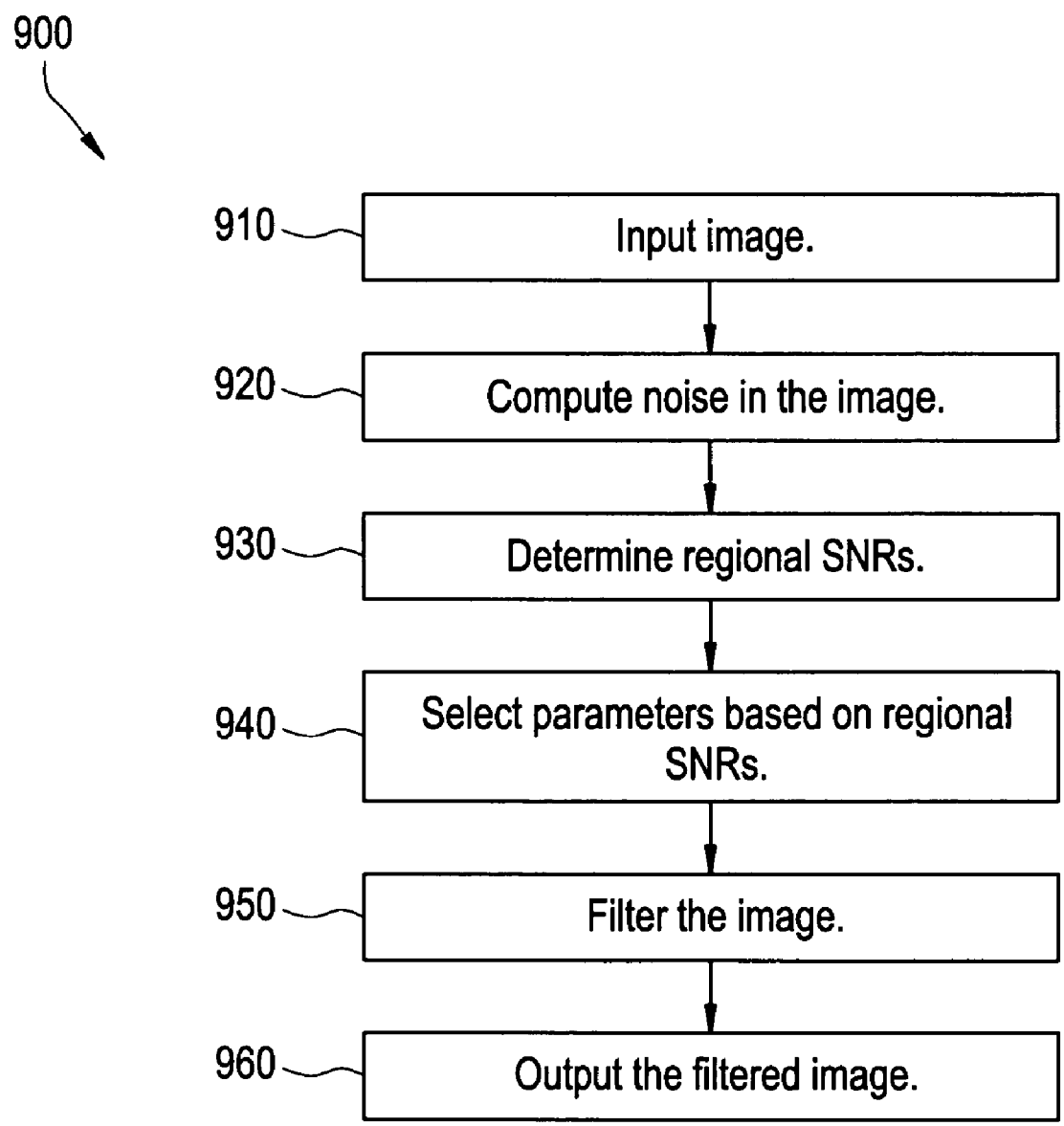
FIG. 9 illustrates a flow diagram for a method for SNR-dependent image processing used in accordance with an embodiment of the present invention.

FIG. 9 illustrates a flow diagram for a method 900 for SNR-dependent image processing used in accordance with an embodiment of the present invention. First, at step 910, an image is input into the system 100. The image includes data signals representing pixel values. A data signal intensity value relates to the strength of the pixel in the resulting image.

Then, at step 920, noise in the image is computed. As described above, various methods may be used to determine noise in the image data. For example, noise may be determined by calculating a difference between the image data values in a region and homogenized or smoothed data values. Data signal values may also be compared to background, air, or standard values to identify noise, for example.

Next, at step 930, regional SNRs are determined. That is, ratios of image data signals to noise are obtained. SNRs may be obtained for an entire image and/or for one or more regions in the image. In an embodiment, SNR determinations may be approximate determinations.

Then, at step 940, parameters are selected based on the regional SNRs. Global parameters are selected based on regional SNRs. Additionally, locally varying masks of blending functions are determined based on regional SNRs. Parameters and masks may also be selected based on global SNRs. SNR-dependent blending logic based on user image quality preference may be used to determine the masks and parameters. That is, user preferences empirically obtained from users of the system 100 may be a factor in selecting parameters and masks to produce a desired image filter. In an embodiment, parameter values are selected from a lookup table based on SNR values. In another embodiment, parameter values may be generated based on SNR values.

At step 950, the image is filtered. The image data, masks, and SNR-dependent parameters are used to filter the image. The size of the image may be adjusted. Structures and/or non-structures in an image may be smoothed and/or sharpened. Structures and/or non-structures may be blended as well. Noise and selected parameters are used to process the image to produce an image possessing a quality desirable to a particular user. Finally, at step 960, the filtered image is output for use by a user. The image may be stored, displayed, and/or otherwise transmitted.

Thus, certain embodiments of the present invention provide a system and method for processing an image based on user preferences. Certain embodiments provide a system and method for computing SNR from regions in the current image. Image processing parameters are selected based on user preferences for various SNR ranges.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for image processing using signal-to-noise ratio dependent filtering, said method comprising:
   measuring noise in an image;
   computing a signal-to-noise ratio for a region in the image;
   selecting parameters for an image filter framework based on the signal-to-noise ratio; and
   processing the image in the filter framework using the parameters.

2. The method of claim 1, wherein said selecting step further comprises selecting parameters based on user preference.

3. The method of claim 1, wherein said selecting step further comprises selecting locally and globally varying parameters.

4. The method of claim 1, further comprising:
   computing a plurality of signal-to-noise ratios for a plurality of regions in the image; and
   selecting parameters for the image filter framework based on the plurality of signal-to-noise ratios.

5. A method for regional filtering of an image, said method comprising:
   computing at least one signal-to-noise ratio for at least one region of an image;
   determining a filter parameter for the at least one region based on the at least one signal-to-noise ratio; and
   processing the at least one region of the image based on the filter parameter.

6. The method of claim 5, wherein said determining step further comprises determining the filter parameter based on user preferences.

7. The method of claim 5, wherein said determining step further comprises selecting locally and globally varying parameters.

8. The method of claim 5, further comprising the step of calculating noise in the image.

9. The method of claim 8, wherein said calculating step further comprises calculating noise in the image based on a difference between the image and a smoothed image.

10. An image processing system for signal-to-noise ratio dependent processing of an image, said system comprising:
    a signal-to-noise ratio processor for determining a signal-to-noise ratio for a region in an image;

a parameter selection unit for selecting at least one filter parameter for the region based on said signal-to-noise ratio; and an image filter for filtering the region in said image based on said at least one filter parameter.

11. The system of claim 10, wherein the signal-to-noise ratio processor determines a plurality of signal-to-noise ratios for a plurality of regions in said image.

12. The system of claim 10, wherein said parameter selection unit further selects locally varying parameters and globally varying parameters.

13. The system of claim 12, wherein said locally varying parameters include blend and edge-smooth parameters.

14. The system of claim 12, wherein said globally varying parameters include a focus parameter.

15. The system of claim 12, wherein said locally varying parameters are determined based on a histogram of local signal-to-noise ratios.

16. The system of claim 12, wherein said globally varying parameters are determined based on a histogram of signal-to-noise ratios for a plurality of images.

17. The system of claim 10, wherein said parameter selection unit further comprises a lookup table relating said signal-to-noise ratio and said filter parameters.

18. The system of claim 17, wherein said lookup table relates signal-to-noise ratios to filter parameters based on user preferences.

19. The system of claim 10, wherein said parameter selection unit selects at least one filter parameter based on user preference.

20. An image processing system for signal-to-noise ratio dependent processing of an image, said system comprising:
a signal-to-noise ratio processor for determining a signal-to-noise ratio for an image;
a parameter selection unit for selecting at least one filter parameter for based on said signal-to-noise ratio, wherein said parameter selection unit further selects locally varying parameters and globally varying parameters and wherein said locally varying parameters include blend and edge-smooth parameters; and
an image filter for filtering said image based on said at least one filter parameter.

21. An image processing system for signal-to-noise ratio dependent processing of an image, said system comprising:
a signal-to-noise ratio processor for determining a signal-to-noise ratio for an image;
a parameter selection unit for selecting at least one filter parameter for based on said signal-to-noise ratio, wherein said parameter selection unit further selects locally varying parameters and globally varying parameters and wherein said locally varying parameters are determined based on a histogram of local signal-to-noise ratios; and
an image filter for filtering said image based on said at least one filter parameter.

22. An image processing system for signal-to-noise ratio dependent processing of an image, said system comprising:
a signal-to-noise ratio processor for determining a signal-to-noise ratio for an image;
a parameter selection unit for selecting at least one filter parameter for based on said signal-to-noise ratio, wherein said parameter selection unit further selects locally varying parameters and globally varying parameters and wherein said globally varying parameters are determined based on a histogram of signal-to-noise ratios for a plurality of images; and
an image filter for filtering said image based on said at least one filter parameter.

23. An image processing system for signal-to-noise ratio dependent processing of an image, said system comprising:
a signal-to-noise ratio processor for determining a signal-to-noise ratio for an image;
a parameter selection unit for selecting at least one filter parameter for based on said signal-to-noise ratio, wherein said parameter selection unit further comprises a lookup table relating said signal-to-noise ratio and said filter parameters; and
an image filter for filtering said image based on said at least one filter parameter.

24. The system of claim 23, wherein said lookup table relates signal-to-noise ratios to filter parameters based on user preferences.

* * * * *